United States Patent
Mohamed et al.

(10) Patent No.: US 11,613,641 B1
(45) Date of Patent: Mar. 28, 2023

(54) THERMOCHROMIC POLYMERIC NANOCOMPOSITES AND METHODS OF MAKING SAME

(71) Applicant: KING FAISAL UNIVERSITY, Al-Ahsa (SA)

(72) Inventors: Osama Saber Yehya Mohamed, Al-Ahsa (SA); Mostafa Osama Saber Yehya Mohamed, Al-Ahsa (SA); Abdullah Ibraheem Aljaafari, Al-Ahsa (SA); Aya Osama Saber Yehya Mohamed, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 17/737,934

(22) Filed: May 5, 2022

(51) Int. Cl.
*C08L 29/04* (2006.01)
*C08K 3/22* (2006.01)
*B82Y 30/00* (2011.01)
*B82Y 40/00* (2011.01)

(52) U.S. Cl.
CPC .............. *C08L 29/04* (2013.01); *C08K 3/22* (2013.01); *B82Y 30/00* (2013.01); *B82Y 40/00* (2013.01); *C08K 2003/2227* (2013.01); *C08K 2201/005* (2013.01); *C08K 2201/011* (2013.01)

(58) Field of Classification Search
CPC ......... C08L 29/04; B82Y 30/00; B82Y 40/00; C08K 3/22; C08K 2003/2227; C08K 2003/2289; C08K 2201/011
See application file for complete search history.

(56) References Cited

U.S. PATENT DOCUMENTS

2020/0325351 A1   10/2020   Fujita et al.

FOREIGN PATENT DOCUMENTS

| CN | 101245151 A | * | 8/2008 | ............... C08J 5/18 |
| CN | 107325371 A | | 11/2017 | |
| KR | 2002-0074599 A | | 10/2002 | |
| KR | 20150063770 A | * | 6/2015 | ............... G02B 1/04 |

OTHER PUBLICATIONS

Huang et al. Facile preparation of poly(vinyl alcohol) nanocomposites with pristine layered double hydroxides, Materials Chemistry and Physics, 130, 2011, 890-896. Published online Nov. 1, 2011 (Year: 2011).*
Yeun et al. Poly(vinyl alcohol) nanocomposite films: thermooptical properties, morphology, and gas permeability, Journal of Applied Polymer Science, vol. 101, 591-596, 2006. Published online Apr. 25, 2006 (Year: 2006).*

(Continued)

*Primary Examiner* — Jane L Stanley
(74) *Attorney, Agent, or Firm* — Nath, Goldberg & Meyer; Richard C. Litman

(57) ABSTRACT

A thermochromic polymeric nanocomposite includes layered double hydroxides (LDHs) and an embedded organic polymer. The thermochromic polymeric nanocomposite exhibits thermochromic activity, e.g., changes in color in response to a change in higher temperatures. The higher temperatures can range from 100° C.-150° C. or higher. As such, the thermochromic polymeric nanocomposite can be used to monitor temperature changes for materials approaching very high temperatures.

3 Claims, 2 Drawing Sheets

(56) References Cited

OTHER PUBLICATIONS

Zhou et al., Facile synthesis of LDH nanoplates as reinforcing agents in PVA nanocomposites, Polymers Advanced Technologies, 2017, 28, 386-392. Published online Aug. 30, 2016. (Year: 2016).*

Ramaraj et al., Thermal and morphological properties of poly(vinyl alcohol) and layered double hydroxide (LDH) nanocomposites, Polymer-Plastics Technology and Engineering, 47, 733-738, 2008. (Published online Jun. 22, 2010). (Year: 2008).*

Wang et al., A reversible photochromic switch based on self-assembly of layered double hydroxide and decatungstate, Sensors and Actuators B: Chemical, 223, 2016, 634-640. Published online Oct. 14, 2015 (Year: 2015).*

Shu et al., Bioinspired design and assembly of layered double hydroxide/poly(vinyl alcohol) film with high mechanical performance, Applied Materials & Interfaces, 2014, 6, 15154-15161. Published online Aug. 20, 2014. (Year: 2014).*

Chen et al., Electrically conductive poly(vinyl alcohol) hybrid films containing graphene and layered double hydroxide fabricated via layer-by-layer self-assembly, Applied Materials & Interfaces, vol. 2, No. 7, 2005-2011, 2010. Published online Jun. 21, 2010. (Year: 2010).*

Huang et al., Heterogeneous ultrathin films of poly(vinyl alcohol)/layered double hydroxide and montmorillonite nanosheets via layer-by-layer assembly, Journal of Physical Chemistry B, 2009, 113, 15225-15230. Published online Oct. 27, 2009. (Year: 2009).*

Ramaraj, et al., "Poly(vinyl alcohol) and layered double hydroxide composites: Thermal and mechanical properties", Journal of Applied Science, vol. 116, No. 3, pp. 1671-1677, 2010.

* cited by examiner

THERMOCHROMIC POLYMERIC NANOCOMPOSITES AND METHODS OF MAKING SAME

BACKGROUND

1. FIELD

The disclosure of the present patent application relates to thermochromic materials and particularly, to thermochromic materials that change color in response to temperature changes in high temperature ranges.

2. DESCRIPTION OF THE RELATED ART

Thermochromic compositions or materials signal temperature changes by changing color as they get hotter or colder. This is in contrast to substances that turn, for example, red hot when they are heated extensively—like iron heated to very high temperatures. For such materials, the heat energy is converted to light energy, demonstrating incandescence.

Many thermochromic compositions can change color at low temperatures through mechanisms other than incandescence. Typical thermochromic compositions can be based on liquid crystals, or they can be based on organic dyes, e.g., leucodyes.

Thermochromic liquid crystals produce color through iridescence. Changes in color are produced by selective reflection of white light waves reflecting off the crystals. The color of the reflected light depends on the spacing of the crystals. Accordingly, as the crystals are heated, changing the spacing between crystals, the color of the reflected light changes, such as from colorless, sequentially to red, orange, yellow, green, blue, violet, and then black again. Cooling the crystals typically reverses the color change sequence.

Leucodyes, in contrast, typically change color when switching between two chemical forms. Reversible transformations can be caused by heat (thermochromism), light (photochromism), or pH (halochromism). Thermochromic leucodyes change color due to changes in temperature.

Thermochromic materials used as temperature sensors for detecting changes in temperature typically detect temperature change in fairly low temperature ranges, e.g., temperatures ranging from about 30° C. to about 70° C. However, many potential uses involve critical temperature changes at higher temperatures. For example, many materials are very sensitive to higher temperatures, potentially degrading, or even exploding if a high enough temperature is reached. Accordingly, a thermochromic composition that may be used to monitor changes occurring in higher temperatures is desired.

3. SUMMARY

A thermochromic polymeric nanocomposite includes layered double hydroxides (LDHs) and an embedded organic polymer. The thermochromic polymeric nanocomposite exhibits thermochromic activity, e.g., changes in color in response to a temperature change in higher temperatures. The higher temperatures can range from 100° C.-150° C. or higher. As such, the thermochromic polymeric nanocomposite can be used to monitor temperature changes for materials approaching very high temperatures. For example, the thermochromic polymeric nanocomposite may be used to detect temperature changes of explosive materials that are very sensitive to higher temperatures. As another unlimiting example, weapons can be painted or coated with the thermochromic polymeric nanocomposite, enabling monitoring of the temperature of the weapons through observation of color change to help avoid explosion or damage. Similarly, the thermochromic polymeric nanocomposite can be used in commercial applications where such a change in temperature ideally can be monitored to allow appropriate caution to be taken.

Typically, the change of color of the thermochromic polymeric nanocomposite in response to temperature change can be a reversible color change from pink to blue when heated to a temperature of 150° C. or greater, and from blue to pink when the temperature falls below 150° C. Thus, the thermochromic polymeric nanocomposite can be used frequently and multiple times. Further, the thermochromic polymeric nanocomposite can be easily fabricated from relatively simple, inexpensive components, compared to materials required for fabricating other thermochromic materials, including dyes and organic species.

These and other features of the present disclosure will become readily apparent upon further review of the following specification and drawings.

4. BRIEF DESCRIPTION OF THE DRAWINGS

Similar reference characters denote corresponding features consistently throughout the attached drawings.

5. DETAILED DESCRIPTION OF THE EMBODIMENTS

A thermochromic polymeric nanocomposite can include layered double hydroxides (LDHs) and an organic polymer. For example, the thermochromic polymeric nanocomposite can include Co—Al nanolayers and the organic polymer. In an embodiment, the organic polymer is polyvinyl alcohol. The thermochromic polymeric nanocomposite can be fabricated by, for example, intercalation reactions between chains of polyvinyl alcohol and the layered double hydroxides (LDHs). The thermochromic polymeric nanocomposite exhibits thermochromic activity in higher temperatures, e.g., reversible changes in color in response to a change in higher temperatures. The higher temperatures can range from 100° C.-150° C. or higher.

Figure 1:
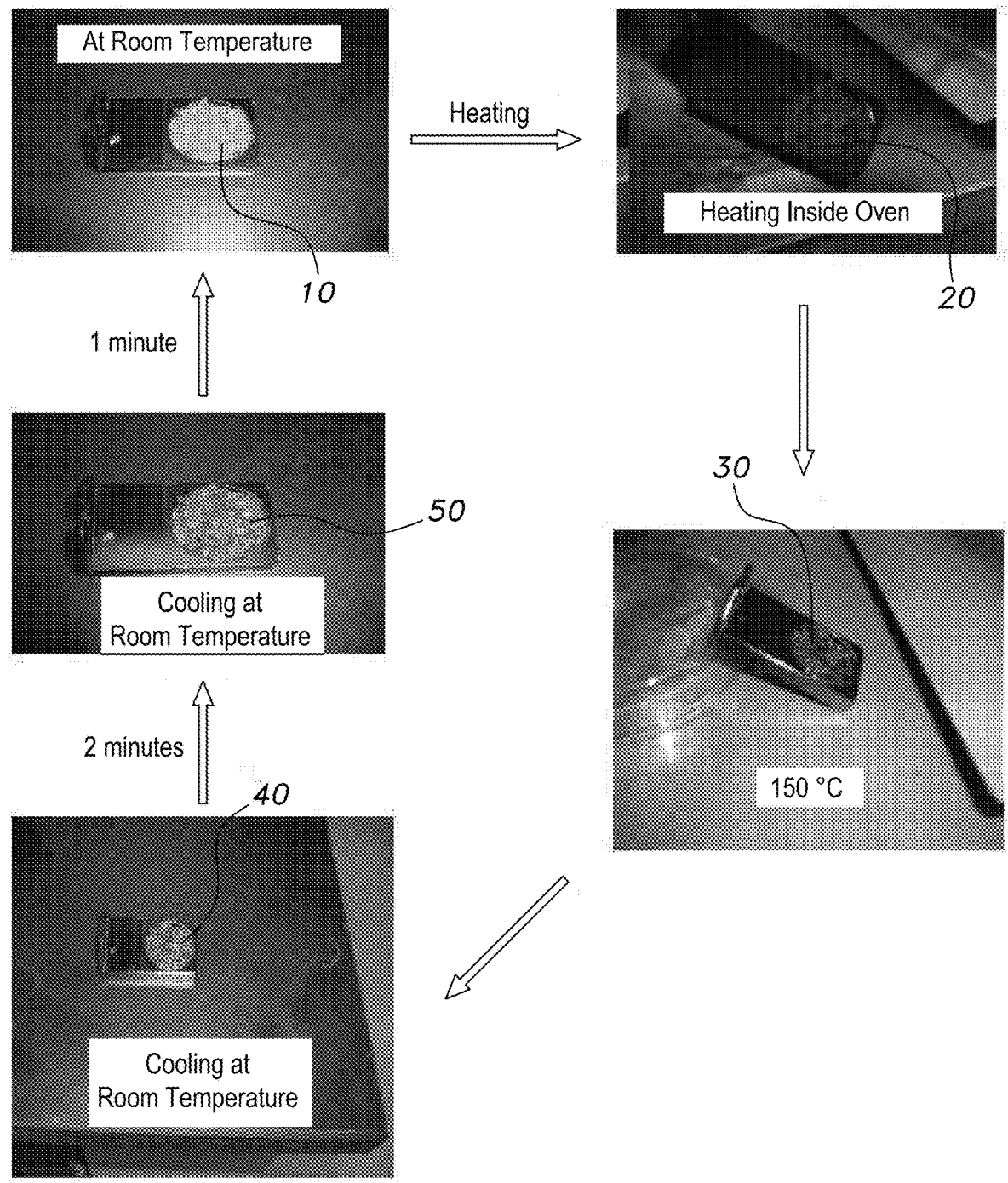
FIG. 1 is a flowchart demonstrating reversible thermochromic behavior at different temperatures of the thermochromic polymeric nanocomposite.

In experiment, an exemplary thermochromic polymeric nanocomposite prepared as described herein showed reversible thermochromic behavior. As shown in FIG. 1, the exemplary thermochromic polymeric nanocomposite was pink 10 at room temperature, dark purple 20 when heated inside an oven to temperatures above 150° C., dark blue 30 at 150° C., light blue 40 then lavender 50 while cooling from 150° C. to room temperature, and finally pink 10 a few minutes after room temperature was achieved. It was further observed that when the thermochromic polymeric nanocomposite was combined with another polymer to form a second product, the second product assumed the thermochromic activity of the thermochromic polymeric nanocomposite during temperature changes.

The thermochromic polymeric nanocomposite can be prepared by combining layered double hydroxides (LDHs) that include at least one colored metal with a suitable organic polymer. In an embodiment, the at least one colored metal includes cobalt and/or aluminum and the polymer is polyvinyl alcohol (PVA). The method can include mixing cobalt chloride with aluminum chloride at a pH of about 7 to produce a fine powder of Co—Al layered double hydroxides and dispersing the fine powder in distilled water to produce a homogenous powder suspension. Polyvinyl alcohol can be dissolved in hot distilled water at 70° C. to form an aqueous solution of PVA, optionally by stirring the mixture for two hours at 70° C. The homogenous powder suspension can be added to the aqueous solution of PVA to form a mixture. The solvent from the mixture can be evaporated until the mixture becomes viscous. The viscous mixture can be dried to form a film of the thermochromic polymeric nanocomposite.

Thermochromic materials are substances that change color in response to reaching or surpassing a particular temperature. As a result, thermochromic materials are often used as sensors for temperature or temperature change. This property makes such materials useful for a wide range of commercial and industrial purposes. Conventional thermochromic materials are limited to detecting temperature changes at about 30-70° C. In contrast, the present thermochromic materials are useful for detecting temperature changes at 100-150° C. or higher. Thus, the thermochromic polymeric nanocomposite can be used to monitor temperature changes much higher than most thermochromic materials presently in use.

For example, the thermochromic polymeric nanocomposite can be used to detect temperature changes that occur in many explosive materials which are very sensitive to higher temperatures. If the temperature of these explosive materials increases above 100-150° C., there is a high risk of detonation and explosion. For example, the 2020 Beirut explosion of Aug. 4, 2020, occurred after a significant temperature increase of a large amount of ammonium nitrate stored at the port of Beirut, Lebanon. The explosion caused at least 218 deaths, 7,000 injuries, and $15 billion in property damage, while leaving an estimated 300,000 people homeless. If the ammonium nitrate were coated by the thermochromic polymeric nanocomposite described herein, the thermochromic change of color from pink to dark blue once higher temperatures were reached, could have provided a warning that the material would soon explode or burn.

As another example, weapons can be painted or coated with the thermochromic polymeric nanocomposite, enabling monitoring of the temperature of the weapons during military procedures to help avoid explosion or damage.

A change of color of the thermochromic polymeric nanocomposite is a reversible process. Thus, after the pink color of the thermochromic polymeric nanocomposite changes to a deep blue color at temperatures of 150° C. or higher, the blue color returns to pink within a few minutes after cooling to room temperature. Accordingly, the thermochromic polymeric nanocomposite may be used as a temperature sensor frequently and repeatedly.

The thermochromic polymeric nanocomposite may easily be fabricated from relatively simple components compared with other thermochromic materials that include dyes and organic species. Furthermore, the components of the polymeric nanocomposite generally are inexpensive because the starting materials for the fabrication do not themselves have thermochromic properties. Starting materials with thermochromic properties tend to be significantly more expensive. The starting materials for the thermochromic polymeric nanocomposite of the present teachings can be, for example, polyvinyl alcohol (PVA) and layered double hydroxides (LDHs). Polyvinyl alcohol and layered double hydroxides do not themselves exhibit thermochromic properties. As such, the present process does not require expensive starting materials.

LDHs are a known large family of two-dimensional layered structures. They include nanolayers that confine embedded agents—the dispersed phase—to only one layer. The confinement is somewhat "soft" because the embedded agents typically are located in an interlayer between two "hard" layers, such that the interlayer can to some extent adjust to the thickness of the embedded composition. Accordingly, the guest species is free to move within the interlayer environment around them. In the nanocomposite of the present teachings, the guest species is an organic polymer, e.g., polyvinyl alcohol.

The nanolayers are generally composed of di- and trivalent metals arranged in an ordered structure. In general, LDHs may be represented by the general formula

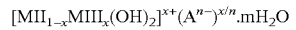

where MII and MIII are di- and tri-valent cations, respectively;
the value of x is equal to the molar ratio of MII/(MII+MIII) and is generally in the range 0.2-0.33; and $A^{n-}$ is an anion.

By using an organic species as the embedded agent or dispersed phase, the result is an organic-inorganic nanohybrid. Because of the dual functionality of organic-inorganic hybrid materials, this area also provides a good foundation for polymer-clay nanocomposites.

Polymer-clay nanocomposites are a fairly-new class of composites with a polymer matrix, in which the dispersed phase is typically silicate particles with at least one dimension measurable in the nanometer range. These nanocomposites are the subject of increasing interest because they can possess the advantages of both organic materials and inorganic materials, presenting many potential commercial applications.

Lamellae obtained by exfoliation of layered solids capable of intercalation have a thickness of 0.5 nm-1 nm, so they represent suitable fillers with a large aspect ratio. Moreover, the layered solids can be used as hosts for organic agents having desired functional groups compatible with the polymers.

Figure 2:
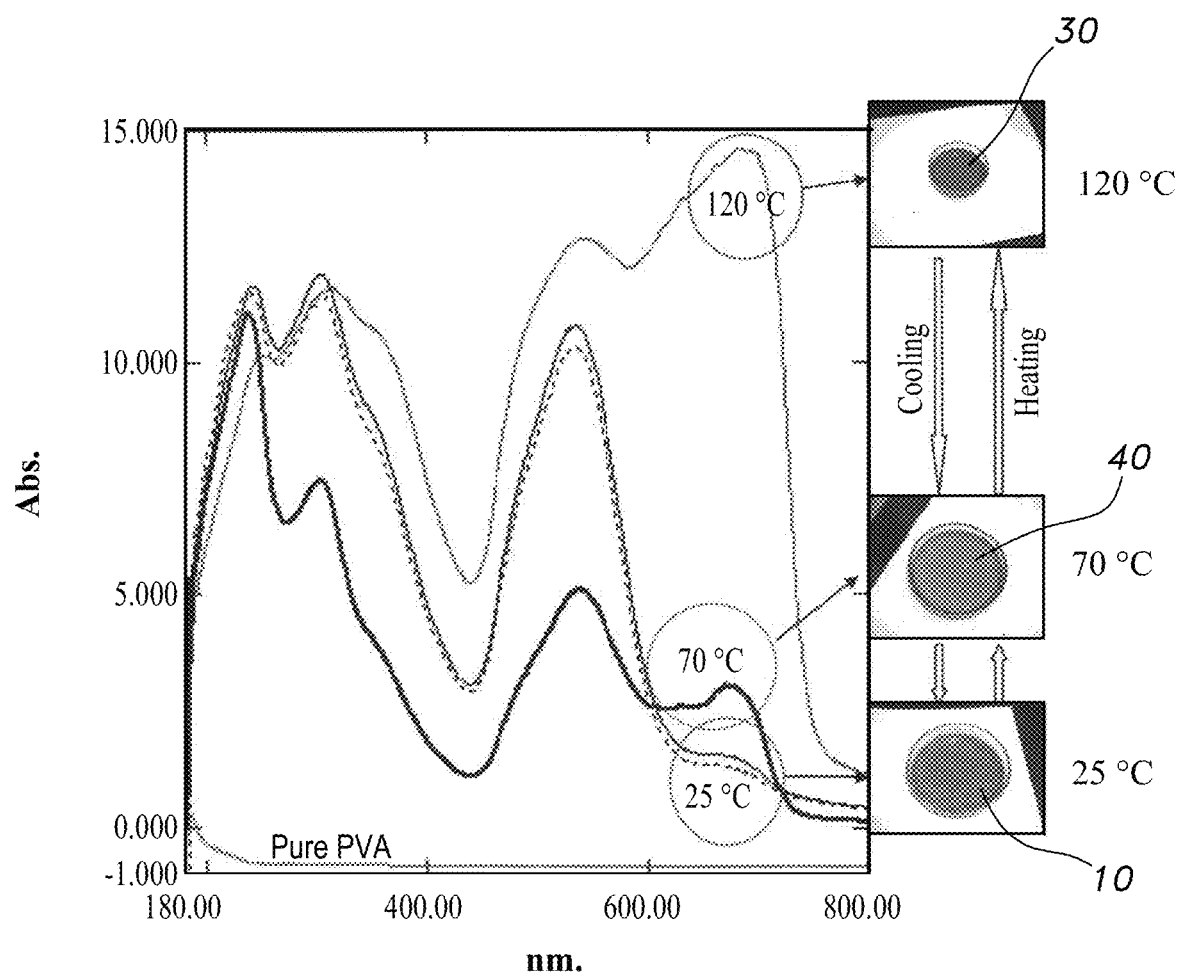
FIG. 2 shows comparative UV-Vis spectroscopy plots for the sample of FIG. 1, comparing the thermochromic changes at different temperatures—25° C., 70° C., and 120° C.

By intercalation reactions with polymer, the nanolayers of LDHs are incorporated with the chains of polyvinyl alcohol. The resulting polymer product showed reversible thermochromic behavior as shown in FIG. 1. This behavior was confirmed by UV-Vis-IR spectroscopy as shown in FIG. 2. When the resulting polymeric product was mixed with another polymer, the thermochromic behavior was induced in the resulting polymer.

The present teachings are illustrated by the following examples.

Example 1

Preparation—Co—Al Layered Double Hydroxides

Co—Al layered double hydroxides were prepared by mixing cobalt chloride (CoCl) with aluminum chloride (AlCl$_3$) in the presence of a pH controller, such that at a pH above 7, a very fine powder of Co—Al layered double hydroxides was precipitated. The powder of Co—Al layered double hydroxides was then dispersed in distilled water and ultra-sonicated with magnetic stirring for 24 hours to get homogenous solution. PVA was dissolved in hot distilled water at 70° C. on a magnetic stirrer for 2 hours. The homogenous solution was then added to the aqueous solution of PVA. The solvent (water) in the solution was evaporated at 70° C. until the mixture became viscous. The viscous mixture was then dried at room temperature until a film of the thermochromic polymeric nanocomposite was formed.

Example 2

Thermochromic Behavior

The resulting thermochromic polymeric nanocomposite demonstrated reversible thermochromic behavior, as shown in FIG. 1. This behavior was confirmed by UV-Vis-IR spectroscopy, as shown in FIG. 2. When the product was mixed with another polymer, thermochromic behavior was also induced in the other polymer.

It is to be understood that the thermochromic polymeric nanocomposites and their uses are not limited to the specific embodiments described above but encompass any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A thermochromic polymeric nanocomposite, consisting of layered double hydroxides (LDHs) and an intercalated organic polymer, wherein the layered double hydroxides include cobalt and aluminum nanolayers, the organic polymer is polyvinyl alcohol, and wherein the thermochromic polymer nanocomposite exhibits thermochromic activity in the form of a reversible color chance occurring at or above about 150° C.

2. A method of preparing the thermochromic polymeric nanocomposite of claim 1, wherein the method comprises the steps of:
   mixing cobalt chloride with aluminum chloride at a pH of about 7 to produce a fine powder of Co—Al layered double hydroxides;
   dissolving polyvinyl alcohol in hot distilled water at 70° C. to form an aqueous solution of polyvinyl alcohol;
   dispersing the fine powder of Co—Al layered double hydroxides in distilled water to produce a homogenous powder suspension;
   adding the homogenous powder suspension to the aqueous solution of polyvinyl alcohol to form a mixture;
   evaporating the water from the mixture until the mixture becomes viscous; and
   drying the viscous mixture to form a film of the thermochromic polymeric nanocomposite.

3. The method of preparing the thermochromic polymeric nanocomposite according to claim 2, wherein the step of forming the aqueous solution of polyvinyl alcohol is achieved by stirring the mixture at 70° C. for two hours.

* * * * *